United States Patent [19]

Baver et al.

[11] 4,143,357
[45] Mar. 6, 1979

[54] TRANSDUCING DEVICE FOR SIGNATURE VERIFICATION SYSTEM

[75] Inventors: Donald W. Baver, Dayton; Robert H. Granzow, Miamisburg; William R. Horst, Dayton; Bruno J. Paganini, Centerville, all of Ohio

[73] Assignee: NCR Corporation, Dayton, Ohio

[21] Appl. No.: 889,766

[22] Filed: Mar. 24, 1978

[51] Int. Cl.² .......................... G06K 9/00; G01L 5/16
[52] U.S. Cl. ........................ 340/146.3 SY; 73/141 A; 73/432 R
[58] Field of Search ............ 340/146.3 SY; 73/432 R, 73/141 A; 177/210 R

[56] References Cited

U.S. PATENT DOCUMENTS

| | | | |
|---|---|---|---|
| 3,480,911 | 11/1969 | Danna | 340/146.3 SY |
| 3,491,588 | 1/1970 | Yerman | 73/141 A |
| 3,563,097 | 2/1971 | Roggenstein et al. | 340/146.3 SY |
| 3,572,109 | 3/1971 | Yerman | 73/141 A |
| 3,956,734 | 5/1976 | Radcliffe, Jr. | 73/432 R |
| 3,988,934 | 11/1976 | Kamphoefner et al. | 73/432 R |
| 3,991,402 | 11/1976 | Radcliffe, Jr. | 340/146.3 SY |
| 3,992,933 | 11/1976 | Randolph, Jr. | 73/141 A |
| 4,008,457 | 2/1977 | Radcliffe, Jr. | 340/146.3 SY |

Primary Examiner—Leo H. Boudreau
Attorney, Agent, or Firm—J. T. Cavender; Albert L. Sessler, Jr.

[57] ABSTRACT

A transducing device converts to representative electrical signals those force variations which are produced by the act of a person writing a signature. In the device, a signature writing surface is provided, and is part of an arm attached by resilient means to a support member which in turn is secured to a base. A magnetic core is connected to the underside of the signature writing surface and coacts with a plurality of coils mounted on the base to provide a motion transducer which, with associated circuitry, generates an electrical signal which varies in accordance with the varying forces applied to the signature writing surface as a signature is written thereon. Stop rods secured to the base limit the extent of travel in one direction of the signature writing surface.

11 Claims, 7 Drawing Figures

TRANSDUCING DEVICE FOR SIGNATURE VERIFICATION SYSTEM

BACKGROUND OF THE INVENTION

The need for security in systems utilized in various types of financial, governmental, retail, manufacturing and other establishments, in order to prevent use of the system, or entry into the system, by unauthorized parties is a current and pressing problem. One means for solving this problem is to provide reliable means to verify that the party requesting use of, or entry into, the system is in fact the person he or she claims to be. For the purpose of verifying the identity of an individual, some personal characteristic may be employed.

One suitable characteristic is the force pattern of an individual's signature. Systems have been developed which are capable of distinguishing between a forged signature and a valid signature on this basis. This may be accomplished by detecting individually distinctive force characteristics of a signature to be tested and converting them into electrical signals which can be automatically processed and compared with the stored representation of an authentic signature, for determination of whether or not the tested signature is a valid one.

A number of U.S. Patents have issued which are directed to signature verification, including U.S. Pat. Nos. 3,618,019; 3,818,443 and 3,859,515.

One of the requirements for a signature verification system is an apparatus on which the person whose identity is being tested can write a signature or other data, which apparatus is capable of converting the forces applied in the course of writing the signature or other data to electrical signals. Such a "writing table" thus serves the purpose of generating an analog signal consisting of voltage amplitude variations as a function of time which accurately represents the variations in amplitude of the applied force, as a function of time, required to write a given signature or other data pattern.

The writing table, in order to serve its intended purpose, must satisfy certain minimum requirements. First, the writing surface must be sufficiently large and stable to be convenient and comfortable to the signer, and should not exhibit perceptible motion when being written upon. Also, the writing table must be stable, not easily damaged by external abuse, not influenced by external vibrations, and able to withstand excessive pressures or impact loads without damage. In addition, the writing table must be capable of generating an analog electrical signal with an amplitude directly proportional to the vertical force applied to the writing surface; that is, the relationship of force to voltage must be related by a constant and predetermined calibration factor, which must be independent of the location on the writing surface at which the force is applied. The usable frequency response of the table must be at least 0 hertz (steady state) to 125 hertz, and must be free of resonant or harmonic distortion.

Examples of prior art writing tables intended for use in connection with signature verification systems are shown in U.S. Pat. Nos. 3,563,097; 3,956,734; 3,991,402; and 4,008,457.

SUMMARY OF THE INVENTION

This invention relates to signature verification systems, and more particularly relates to writing tables for use in such systems.

In accordance with one embodiment of the invention, a transducing device for converting to representative signals those force variations which are produced by the act of a person writing predetermined data comprises first support means; second support means; resilient hinge means for connecting said first support means to said second support means; predetermined data writing surface means fixed to said first support means and movable in response to force variations generated by said predetermined data on said predetermined data writing surface means; measuring means secured to said predetermined data surface means and extending therebelow; and sensing means positioned in operative relation to said measuring means for generating an electrical signal which varies in accordance with movement of said measuring means with respect to said sensing means.

It is accordingly an object of the present invention to provide a transducing device for use in a signature verification system.

Another object is to provide a transducing device for converting to representative signals those force variations which are produced by the act of a person writing predetermined data.

A further object is to provide a writing table including a cantilevered writing surface, a vertical support, resilient hinge means for connecting the cantilevered writing surface to the vertical support, and electrical transducing means operatively coupled to the writing surface for generating electrical signals proportional to the pressure applied to said writing surface.

With these and other objects, which will become apparent from the following description, in view, the invention includes certain novel features of construction and combinations of parts, a plurality of forms or embodiments of which are hereinafter described with reference to the drawings which accompany and form a part of this specification.

DETAILED DESCRIPTION OF THE INVENTION

Figure 1:
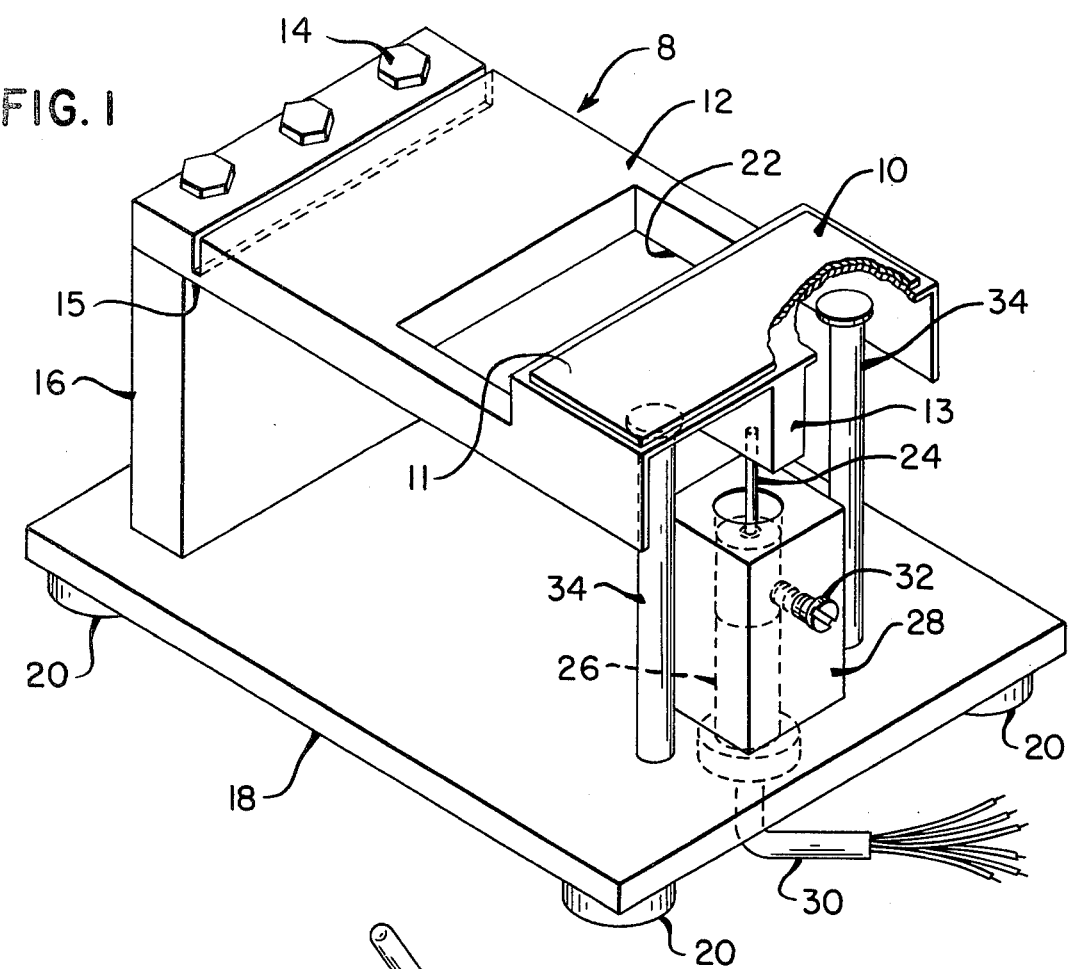
FIG. 1 is a perspective view, partly broken away, of the writing table of the present invention.

Referring now to the writing table 8 shown in FIG. 1, a writing surface 10 is located at the upper side of one end of a cantilever arm 12 secured by fastening means 14 to a vertical support 16 which in turn is fixed to a base 18, having a plurality of cushioned feet 20 thereon in order to minimize the effect of external mechanical disturbances on the movement of the writing surface 10.

The cantilever arm 12 is provided with resilient hinge means 15 adjacent to the support 16 in order to permit vertical movement of the writing surface 10 in response to force applied thereto. The writing surface 10 may be the flat horizontal upper end surface of the cantilever member 12 or may be the upper surface of a separate element 11 secured thereto, as shown in FIG. 1, if desired, in order to produce a better writing surface than is provided by the cantilever arm per se.

The cantilever arm 12 is of substantial length, in order to multiply the effect of any force applied to the writing surface 10, is of substantially uniform thickness, and is provided with a cut-out portion 22 to decrease its weight and to increase its resonant frequency. The under-side of the writing surface 10 is of hollow configuration in order to assist in increasing the resonant frequency. A rib 13 reinforces this structure.

Secured beneath the writing surface 10 to the rib 13 is a rod 24 which is connected to a movable component 26 of a motion transducer shown generally at 28. This transducer provides an electrical signal output, as will subsequently be described in greater detail, which is proportional to the movement of the writing surface 10 during writing of a signature or other data thereon, said signal being transmitted through a cable 30 to the remainder of the system circuitry. An adjusting screw 32 is provided to enable the shifting of coil means contained in the transducer 28 with respect to the position of the component 26 as may be desired.

Movement of the arm 12 in a downward direction is limited by contact of its underside with the upper ends of rods 34 which are mounted in the base 18.

Figure 2:
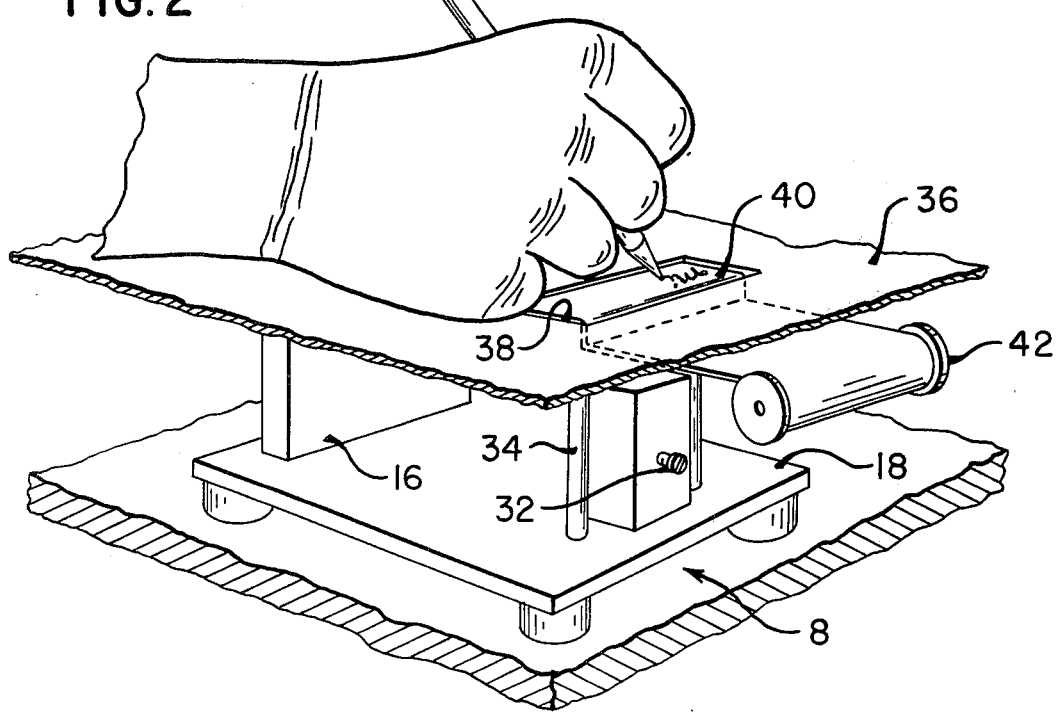
FIG. 2 is a perspective view, partly broken away, showing the writing table incorporated in a counter or similar furnishing having an aperture therein to permit the writing surface of the writing table to lie in substantially coplanar relationship with the countertop to facilitate writing thereon, and also showing a record medium on which a signature or other data may be recorded.

FIG. 2 illustrates a typical installation of the writing table 8 in a counter having a top surface 36. An aperture 38 in the surface 36 permits the writing surface 10 to project therethrough to facilitate writing thereon by a person whose identity is to be verified. If desired, a record medium such as a paper strip 40 may extend from a supply roll (not shown) under the counter surface 36 to the aperture 38, over the writing surface 10 and back under the counter surface 36 to a take-up roll 42 which is capable of advancing the paper an appropriate amount after each signature. Writing on a record medium such as the paper strip 40, where the signature or other data can be seen, is a more natural action for a person than writing on a surface 10 where no legible mark is made. Also, a permanent record of the signature may be retained by use of this system. Alternatively, of course, the surface 10 could be provided with some well-known means whereby a temporary erasable recording of a signature or other data could be made.

Figure 3:
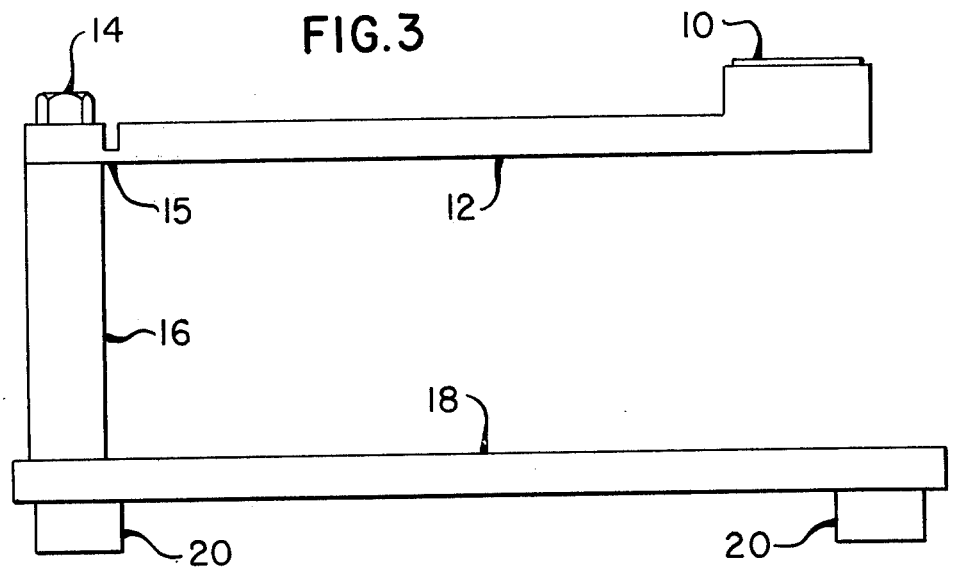
FIG. 3 is an elevation view, showing the manner in which the writing surfaces supported, utilizing the hinge means also shown in FIG. 1.

A significant element of the design of the present invention lies in the hinge 15, which in the embodiment shown in FIGS. 1 and 3, is comprised of a short section of the same material as the arm 12, but which is substantially less in stiffness than said arm or other elements such as the support 16 or the base 18. The arm 12, acting as a lever arm, will therefore transform any downward force on the writing surface 10 into a bending moment at the hinge. Resulting internal stress will cause deflection of the hinge and will result in downward writing surface movement until spring forces within the hinge counterbalance the applied force. Because of the much greater rigidity of the arm 12, the support 16 and the base 18, only the performance of the hinge 15 has any significant effect on writing surface displacement. In order to insure repeatability of operation, the spring material of the hinge must have a yield point well above operational stress levels, and preferably must exhibit a linear stress-strain relationship to cause linear writing surface displacement as a function of writing forces. As a further design requirement, the arm 12 and its supporting structure must strongly resist twisting effects which result from writing near the edge of the writing surface 10 as opposed to writing in the center, thus allowing transducer output to be independent of the relative position in which writing takes place on the surface 10. Proper hinge design, resulting in a short length of comparatively thick material across the entire width of the structure, reduces such twisting effects to an insignificant level. An arm 12 of relatively great length multiplies the effect of any force on the writing surface, thereby permitting a maximum spring thickness and rigidity. In one preferred design, as illustrated in FIGS. 1 and 3, the arm is of substantial thickness near the hinge end in order to insure even distribution of the force over the entire hinge area. An effective hinge is created by machining a slot of the proper dimensions across the entire surface of the arm 12. The end of the arm is rigidly attached to the support 16 by means of the fastening means 14.

Figure 4A:
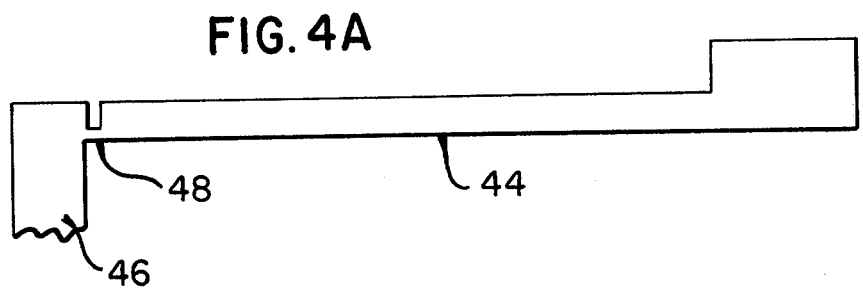
FIGS. 4a, 4b and 4c are partial elevation views, showing alternative forms of hinge means which may be employed.
Figure 4B:
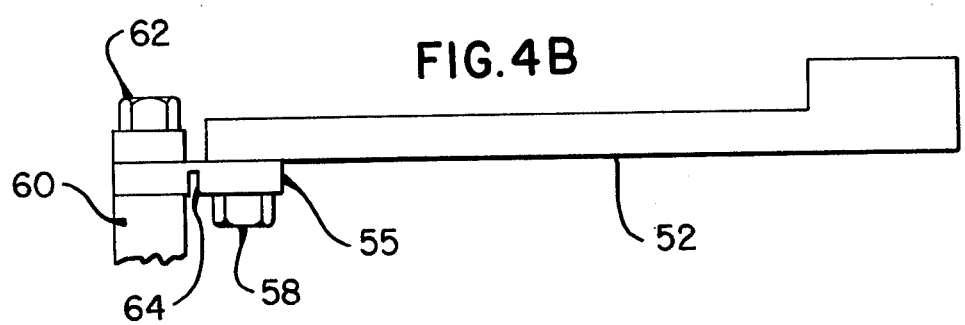
Figure 4C:
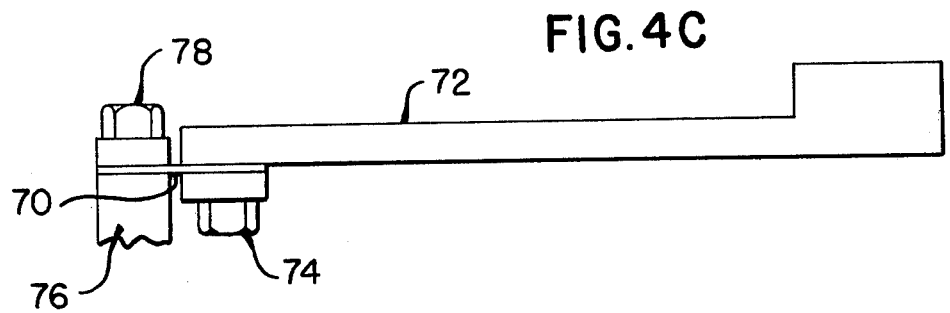

A number of alternative structures are shown in FIGS. 4A, 4B and 4C and will be subsequently discussed. One such alternative, shown in FIG. 4A, provides an arm 44 and a support 46 which are fabricated from a single piece of metal. A hinge 48 is created by machining a slot of the proper dimensions across the entire surface of the arm 44. This meets one desired characteristic of the design, which is that the hinge and the arm should be of the same material.

A preferred material for the arm is aluminum, in order to achieve weight reduction for best frequency response, even though aluminum generally tends to possess a less linear stress-strain relationship than steel and therefore may be considered to be less acceptable for the hinge. However, design data, which will subsequently be discussed, will show conditions of operation under which the all-aluminum design is preferred.

An alternative design, in accordance with FIG. 4B, allows the use of the "optimum" material for the arm which is designated 52 in this case and another material such as steel for the spring hinge which is designated 55. The arm 52 and the hinge 55 are joined to each other by a plurality of fastening means 58, and the hinge 55 is joined to a support 60 by additional fastening means 62. These fastening means 58 and 62 may consist of bolts or other suitable means, which may include a bonding process. The hinge 55 is constructed by machining a suitable slot 64 in a manner similar to that in which the hinge 15 is produced in the embodiment of FIGS. 1 and 3.

A further alternative means of fabrication is illustrated in FIG. 4C. A sheet of material of a different type, such as hardened steel, is accurately machined to the design thickness desired to produce a hinge 70. This hinge is joined to an arm 72 by fastening means 74, and to a support 76 by fastening means 78. The securing of the hinge to the arm 72 and to the support 76 is accomplished so that the free length between the clamping points equals the design length of the spring hinge. The design method of FIG. 4C offers flexibility in choice of materials to achieve desired mechanical characteristics relative to the linearity and magnitude of deflection. It also offers an accurate means of obtaining the proper spring thickness. A primary disadvantage of the embodiment shown in FIG. 4C results from an inexact definition of where the spring hinge begins and ends, due to ambiguous clamping points, and the stability of the effective clamping points. Under the working stresses, any such clamping or bonding means will allow the spring hinge material to move, shifting calibration and zero position. Typical shift with this design means has been shown to be 6 to 10% of the average output signal. The design according to FIG. 4B also allows separate choice of materials and provides clamping areas which are much lower in stress, due to large cross-sectional area at the attachment points, thus clearly defining the length of the spring section. In the design of FIG. 4B, error due to hinge material shifts can be reduced to a level of 1 to 1.5% of average output. The elimination of one joint by the design of FIGS. 1 and 3 further increases stability, reducing error to an average of approximately 0.5%.

Considering a construction of the device of the present invention having, for example, a writing surface centered 4.62 inches from the fixed end of the spring hinge, and providing a maximum deflection of 0.008 inch under an applied force of 800 grams, a bending moment of 8.15 inch pounds is applied to the hinge. Employing a steel hinge having an effective length of 0.60 inch and a thickness of 0.04 inch, conventional beam formulas indicate a maximum stress of 7,640 psi in the material. This is well within the linear stress-strain operating range of steel spring material similar to type 1010. Analyzing the use of aluminum to provide the same function, it will be noted that the modulus of elasticity (E) of aluminum is one-third that of steel. Since the spring force is given by the formula: $3 EI\Delta/L^3$, with the same length (L) the moment of inertia (I) of an aluminum section must be three times that of a steel section. Further, since the moment is given by the equation ($bt^3/12$) and the width (b) of the spring is constant, the thickness (t) of an aluminum section is to be ($3\sqrt[3]{3}$) times the thickness of the steel section or 0.0577 inch to provide the same deflection factor. Under the same 800 gram load, the stress in the aluminum section is calculated to be 3665 psi; about half that for a steel section and approximately 10% of the yield stress of type 6061-T6 aluminum. Considering maximum safe fatigue stress for the steel at 19,600 psi and for the aluminum at 14,000 psi, the steel is operating at 39% of the stress limit and the aluminum at only 26%.

This analysis indicates that a totally aluminum construction in accordance with FIGS. 1 and 3 is therefore the preferred design. The design shown in FIG. 4A would also be quite acceptable if the ease of fabrication were equal to that of the design of FIGS. 1 and 3.

Figure 5:
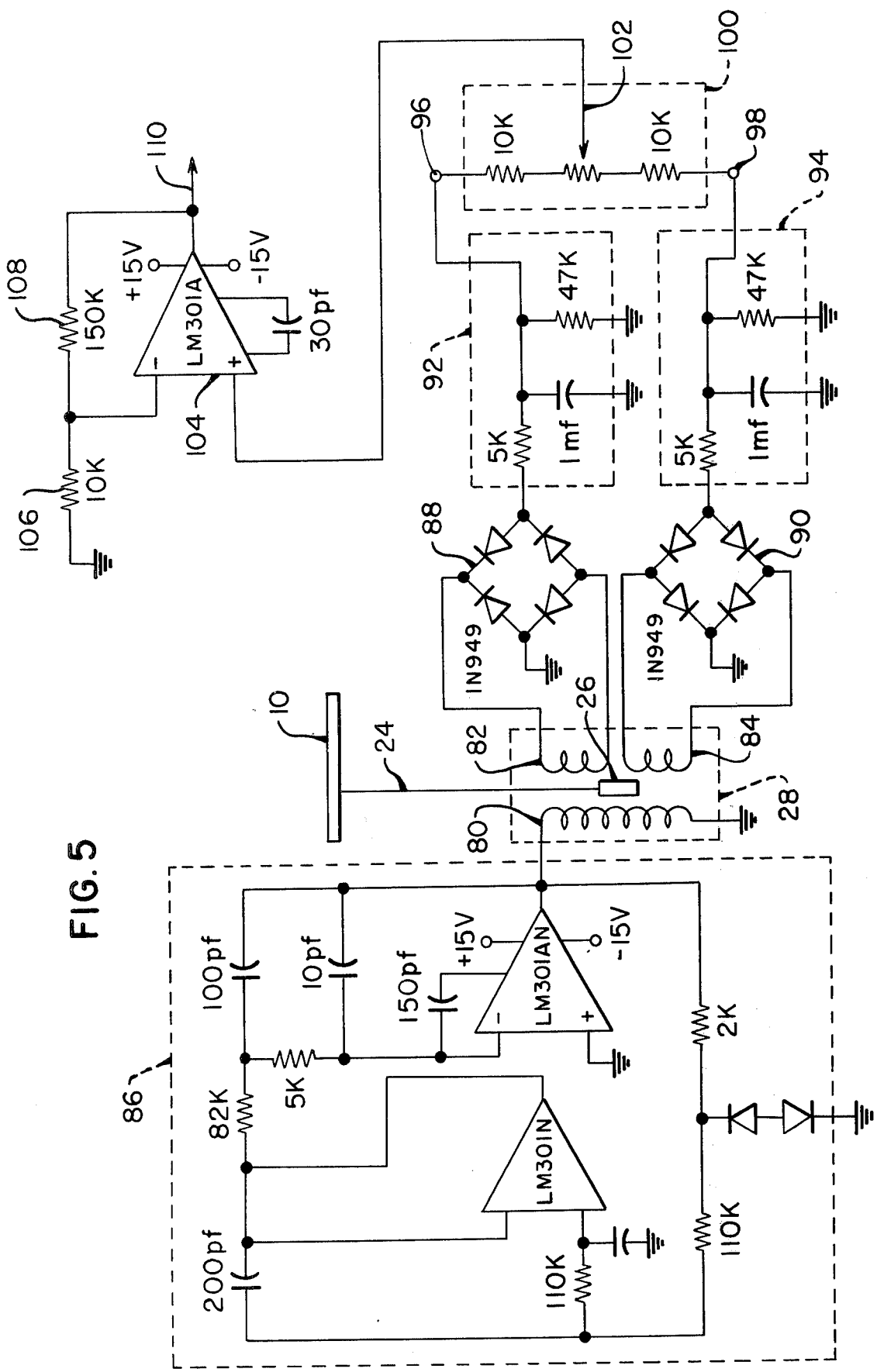
FIG. 5 is a diagram of the circuitry which may be employed to derive the desired electrical signals which represent changes in the forces applied to the writing table during the writing of a signature or other data.

Referring now to the circuit diagram of FIG. 5, the core member 26 which is coupled to the writing surface 10 by the rod 24 is shown in coacting relationship with a primary coil 80 and two identical secondary coils 82, 84 of the transducer 26. In the illustrated embodiment, the core member 26 and the coils 80, 82, 84 comprise a linear variable differential transformer.

While the circuit shown in FIG. 5 is suitable for producing the desired electrical output voltage representative of movement of the writing surface 10, it will be recognized that other, equivalent circuits may also be employed. In the circuit of FIG. 5, component values and types are shown on the drawing, in order to enable one skilled in the art to reproduce the circuit.

The excitation voltage signal applied to the primary coil 80 is generated in the illustrated embodiment by a frequency generator circuit shown generally at 86. Said voltage signal takes the form of a sine wave with low harmonic distortion. The excitation frequency is approximately 20 Khz and the voltage amplitude is approximately 8 volts.

Fullwave rectifiers 88, 90 are coupled to the coils 82, 84, respectively, and the outputs of the rectifiers are filtered in filter circuits 92, 94, respectively, in order to minimize high-frequency ripple content. The output terminal 96 of the circuit 92 is connected to one side of a potentiometer 100 while the output terminal 98 is connected to the other side of said potentiometer. The slide contact 102 of the potentiometer 100 is connected to the positive input of an amplifier 104, while the negative input of said amplifier is connected to a base reference potential shown as ground through a resistor 106 and to the output 110 of said amplifier through a stabilizing resistor 108.

The output 110 of the amplifier 104 provides the desired signal which is representative of the movement of the writing surface 10, and which may be coupled to the remaining circuitry of the signature verification system.

It is believed that the operation of the present invention, and particularly of the circuit of FIG. 5, will be obvious from the description contained above. However, a brief description of said operation will also be included. In the null or inactive position, the core member 26 is centered between the secondary coils 82 and 84. When an excitation voltage is applied to the primary coil 80 from the frequency generator circuit 86, and the core member 26 is moved due to movement of the writing surface 10 by reason of a signature or other data being written thereon, the mutual induction of each secondary winding 82, 84 is varied relative to the primary coil 80, thereby altering the voltages induced by the primary coil 80 in each of the secondary coils 82, 84. It may be noted that in the null position of the core member 26, the voltages induced in each secondary coil 82, 84 are identical in magnitude and 180° out of phase, so there is no net output on the slide contact 102 of the potentiometer 100; the voltages from the coils 82, 84 being applied over the respective rectifiers 88, 90, and filter circuits 92, 94 to the terminals 96, 98 of the potentiometer 100. If the core member 26 is displaced off center, the mutual induction of the primary coil 80 with one of the secondary coils will be greater than with the other. A difference voltage will thus appear on the slide contact 102 of the potentiometer 100, and will be applied to the positive input of the amplifier 104. For off center displacement within the range of operation of the transducer 28, the voltage is essentially a linear function of the vertical displacement of the writing surface. Because there is no mechanical friction between the core member 26 and the coils 80, 82 and 84, and because the mass of the core member is very small, this type of transducer accurately generates an electrical signal representative of the incrementally small motion of the writing surface.

Application of the signal on the slide contact 102 of the potentiometer 100 to the amplifier 104 results in the generation of an output signal at the output 110 of the amplifier 104 in a well-known manner.

In the illustrated embodiment, the linear variable differential transformer and associated circuitry shown in FIG. 5 generates a DC voltage of 10 volts for a maximum vertical deflection of the writing table of 0.08 inch. The output voltage is essentially linear throughout the range of deflection.

The null position of the signature input device may be adjusted by positioning the slide contact 102 of the potentiometer 100 so as to obtain identical resistance values between said slide contact terminal and the terminals 96, 98 at each side of the potentiometer 100. The primary coil 80 is excited by the circuit 86, the retaining screw 32 is loosened, and with no force applied on the writing surface, the coil assembly of the linear variable differential transformer is displaced until a zero voltage reading is obtained at the output of the amplifier 104, after which the retaining screw 32 is once again tightened.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A transducing device for converting to representative electrical signals those force variations which are produced by the act of a person writing a signature, comprising:
   rigid vertical support means;
   rigid horizontal support means;
   resilient hinge means connecting one end of said horizontal support means to said vertical support means, said hinge means comprising a portion of the rigid horizontal support means which is of reduced cross-sectional area to provide increased flexibility in said portion;
   signature writing surface means associated with the other end of said horizontal support means and movable in response to force variations generated by writing a signature on said signature writing surface means;
   measuring means secured to said signature writing surface means and extending therebelow; and
   sensing means positioned in operative relation to said measuring means for generating an electrical signal which varies in accordance with movement of said measuring means with respect to said sensing means.

2. A transducing device for converting to representative electrical signals those force variations which are produced by the act of a person writing a signature, comprising:
   rigid vertical support means;
   rigid horizontal support means;
   resilient hinge means connecting one end of said horizontal support means to said vertical support means, said resilient hinge means being a separate metal leaf spring element secured to the rigid vertical support means and the rigid horizontal support means;
   signature writing surface means associated with the other end of said horizontal support means and movable in response to force variations generated by writing a signature on said signature writing surface means;
   measuring means secured to said signature writing surface means and extending therebelow; and
   sensing means positioned in operative relation to said measuring means for generating an electrical signal which varies in accordance with movement of said measuring means with respect to said sensing means.

3. A transducing device for converting to representative electrical signals those force variations which are produced by the act of a person writing a signature, comprising:
   rigid vertical support means;
   rigid horizontal support means;
   resilient hinge means connecting one end of said horizontal support means to said vertical support means;
   signature writing surface means associated with the other end of said horizontal support means and movable in response to force variations generated by writing a signature on said signature writing surface means;
   measuring means secured to said signature writing surface means and extending therebelow;
   sensing means positioned in operative relation to said measuring means for generating an electrical signal which varies in accordance with movement of said measuring means with respect to said sensing means; and
   adjusting means for adjusting the relative positions at rest of the measuring means and the sensing means.

4. A transducing device for converting to representative electrical signals those force variations which are produced by the act of a person writing a signature, comprising:
   rigid vertical support means;
   rigid horizontal support means comprising a bar having an open portion therein to increase its resonant frequency;
   resilient hinge means connecting one end of said horizontal support means to said vertical support means;
   signature writing surface means associated with the other end of said horizontal support means and movable in response to force variations generated by writing a signature on said signature writing surface means;
   measuring means secured to said signature writing surface means and extending therebelow; and
   sensing means positioned in operative relation to said measuring means for generating an electrical signal which varies in accordance with movement of said measuring means with respect to said sensing means.

5. The transducing device of claim 4 in which the resilient hinge means comprises a portion of the horizontal support means which is of reduced cross-sectional area to provide increased flexibility in said portion.

6. A transducing device for converting to representative electrical signals those force variations which are produced by the act of a person writing a signature, comprising:
   rigid vertical support means;
   rigid horizontal support means;
   resilient hinge means connecting one end of said horizontal support means to said vertical support means, said hinge means comprising a portion of the rigid horizontal support means which is of reduced thickness to provide increased flexibility in said portion;
   signature writing surface means associated with the other end of said horizontal support means and movable in response to force variations generated by writing a signature on said signature writing surface means;

measuring means secured to said signature writing surface means and extending therebelow; and sensing means positioned in operative relation to said measuring means for generating an electrical signal which varies in accordance with movement of said measuring means with respect to said sensing means.

7. A transducing device for converting to representative electrical signals those force variations which are produced by the act of a person writing a signature, comprising:

rigid vertical support means;

rigid horizontal support means;

resilient hinge means comprising a slot extending transversely through the rigid horizontal support means to provide a line of maximum flexibility of said rigid horizontal support means and connecting one end of said horizontal support means to said vertical support means;

signature writing surface means associated with the other end of said horizontal support means and movable in response to force variations generated by writing a signature on said signature writing surface means;

measuring means secured to said signature writing surface means and extending therebelow; and sensing means positioned in operative relation to said measuring means for generating an electrical signal which varies in accordance with movement of said measuring means with respect to said sensing means.

8. A transducing device for converting to representative electrical signals those force variations which are produced by the act of a person writing a signature, comprising:

rigid vertical support means;

rigid horizontal support means;

resilient hinge means connecting one end of said horizontal support means to said vertical support means, the horizontal and vertical support means being fabricated from a single piece of metal;

signature writing surface means associated with the other end of said horizontal support means and movable in response to force variations generated by writing a signature on said signature writing surface means;

measuring means secured to said signature writing surface means and extending therebelow; and sensing means positioned in operative relation to said measuring means for generating an electrical signal which varies in accordance with movement of said measuring means with respect to said sensing means.

9. A transducing device for converting to representative electrical signals those force variations which are produced by the act of a person writing a signature, comprising:

rigid vertical support means;

rigid horizontal support means;

resilient hinge means connecting one end of said horizontal support means to said vertical support means;

signature writing surface means associated with the other end of said horizontal support means and movable in response to force variations generated by writing a signature on said signature writing surface means;

measuring means secured to said signature writing surface means and extending therebelow, said measuring means comprising a core of magnetic material; and sensing means positioned in operative relation to said measuring means for generating an electrical signal which varies in accordance with movement of said measuring means with respect to said sensing means comprising magnetic coil means including two secondary coils fixedly positioned in said device and located in operative relation to said core for generating an electrical signal which varies in accordance with movement of said core with respect to said sensing means, said sensing means also including circuit means coupled to the magnetic coil means for generating a voltage representative of the forces applied to the signature writing surface means, said circuit means including means to rectify and filter the outputs from each of said secondary coils and means to compare the rectified and filtered outputs from the two secondary coils, said comparing means providing said voltage representative of the forces applied to the signature writing surface means.

10. The transducing device of claim 9 in which said circuit means includes means for adjusting the voltage to provide a desired value when the signature writing surface is at rest.

11. A transducing device for converting to representative signals those force variations which are produced by the act of a person writing a signature, comprising:

a base;

a vertical support element secured to the base;

a horizontal support arm;

resilient hinge means for connecting one end of said horizontal support arm to said vertical support element;

a writing table operatively associated with the other end of said horizontal support arm;

a magnetic core member secured to the under side of said writing table and movable vertically in response to varying forces applied to the writing table during the writing of a signature by a person;

coil means including two secondary coils secured to said base and positioned to receive said core member therein and to accommodate its vertical movement; and circuit means coupled to said coil means for generating a voltage representative of the forces applied to the writing table during writing of a signature, said circuit means including means to rectify and filter the outputs from each of said secondary coils and means to compare the rectified and filtered outputs from the two secondary coils, said comparing means providing said voltage representative of the forces applied to the writing table.

* * * * *